United States Patent [19]
Gerdes

[11] Patent Number: 6,036,121
[45] Date of Patent: Mar. 14, 2000

[54] METHOD OF VARYING THE SPEED OF A CENTER PIVOT IRRIGATION SYSTEM

[75] Inventor: Jerry D. Gerdes, Omaha, Nebr.

[73] Assignee: Valmont Industries, Inc., Valley, Nebr.

[21] Appl. No.: 09/152,335

[22] Filed: Sep. 14, 1998

[51] Int. Cl.$^7$ ...................................................... B05B 3/00
[52] U.S. Cl. .......................... 239/728; 239/727; 239/729; 239/1; 239/11
[58] Field of Search .................................. 239/1, 11, 727, 239/728, 729

[56] References Cited

U.S. PATENT DOCUMENTS

| | | | |
|---|---|---|---|
| 3,902,668 | 9/1975 | Daugherty et al. | 239/729 |
| 3,979,062 | 9/1976 | Christensen et al. | 239/11 |
| 4,340,183 | 7/1982 | Kegel et al. | 239/729 |
| 4,569,481 | 2/1986 | Davis et al. | 239/729 |

*Primary Examiner*—Steven O. Douglas
*Assistant Examiner*—Khoa Huynh
*Attorney, Agent, or Firm*—Zarley, McKee, Thomte Voorhees & Sease; Dennis L. Thomte

[57] ABSTRACT

The method of controlling the speed of the last regular drive unit of a center pivot irrigation system having a corner irrigation system pivotally connected thereto is disclosed comprising the steps of: placing a pressure transducer at the downstream side of the main water line for monitoring the changes in main water line pressure as the sprinklers on the extension water line are sequenced; driving the last regular drive unit at a predetermined speed; recording the output of the pressure transducer at predetermined intervals; comparing the recorded output at the predetermined intervals to the pressure recorded when all the sprinklers on the extension line are turned off; and varying the speed of the last regular drive unit according to the formula NEW SPEED=(END PRESSURE/RETRACTED END PRESSURE)$^{1/2}$× L.R.D.U. SPEED SETTING.

4 Claims, 3 Drawing Sheets

METHOD OF VARYING THE SPEED OF A CENTER PIVOT IRRIGATION SYSTEM

BACKGROUND OF THE INVENTION

1. Field of the Invention

This invention relates to a center pivot irrigation system having the ability to irrigate the corners of the field being irrigated and wherein the system is not equipped with sprinkler pressure regulators or sprinkler flow control devices. More particularly, this invention relates to an improved method for controlling the distribution of water from the center pivot portion of the system as the sprinklers on the corner span are sequenced.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower or last regular drive unit (L.R.D.U.) is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field.

A plurality of spaced-apart sprinklers are provided on the main boom as well as on the extension boom. Perhaps the most popular method of guiding the extension tower is the buried wire system described in U.S. Pat. No. 3,902,668. Current center pivot irrigation systems or machines equipped with a corner span will make one speed change as a plurality of sprinkler sequences are turned "on" one at a time (usually six to eight sequences) on the corner span. Those same systems usually make one speed change as a plurality of sprinkler sequences are turned "off" one at a time (usually six to eight sequences) on the corner system. In other words, the center pivot machine will usually slow down as the corner arm is extending out into the corner of the field and will speed up as the corner span is retracting from the corner of the field. The sprinklers on the corner arm are sequenced "on" as the corner arm is extending and are sequenced "off" as the corner arm is retracted. This procedure results in a large portion of the field beneath the center pivot machine being either overwatered or underwatered.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe or line supported upon a plurality of non-steerable drive towers which propel the main water line around the center pivot support structure. An elongated extension boom or corner span, having inner and outer ends, is pivotally connected at its inner end to the outer end of the main boom with the extension boom comprising an elongated extension water pipe supported upon at least one steerable drive tower.

A plurality of spaced-apart sprinklers are provided on the main boom for irrigating the field beneath the main boom. A pressure transducer is provided at the downstream end of the center pivot system to monitor the change in the main line water pressure as the sprinklers are sequenced "on" or "off" on the corner span. A computer program in a computer is used to monitor the pressure transducer output (end pressure). The pressure transducer output is recorded upon a predetermined amount of time increment compared to the pressure recorded when all the sequenced sprinklers on the corner span are turned off (retracted pressure recorded in computer software). If the end pressure has changed from the retracted pressure, the center pivot speed will be changed by the following equation using computer software: NEW SPEED=(END PRESSURE/RETRACTED END PRESSURE)$^{1/2}$×L.R.D.U. SPEED SETTING.

It is therefore a principal object of the invention to provide a method of continuously varying the speed of a non-pressure regulated center pivot irrigation machine equipped with a corner span to compensate for pressure changes as corner span sprinklers are sequenced on or off to maintain a uniform water depth beneath the center pivot area of the machine.

These and other objects will be apparent to those skilled in the art.

DESCRIPTION OF THE PREFERRED EMBODIMENT

Figure 1:
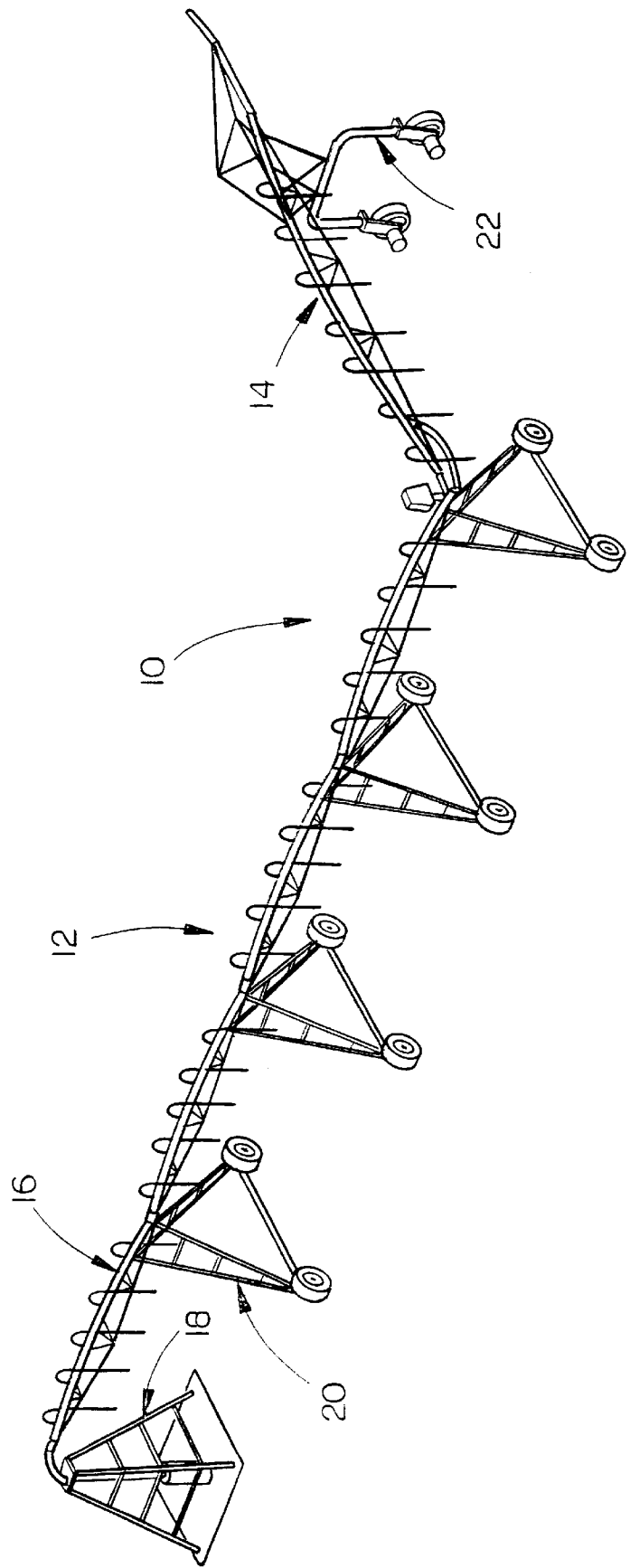
FIG. 1 is a perspective view of a self-propelled irrigation system including a corner span.
Figure 2:
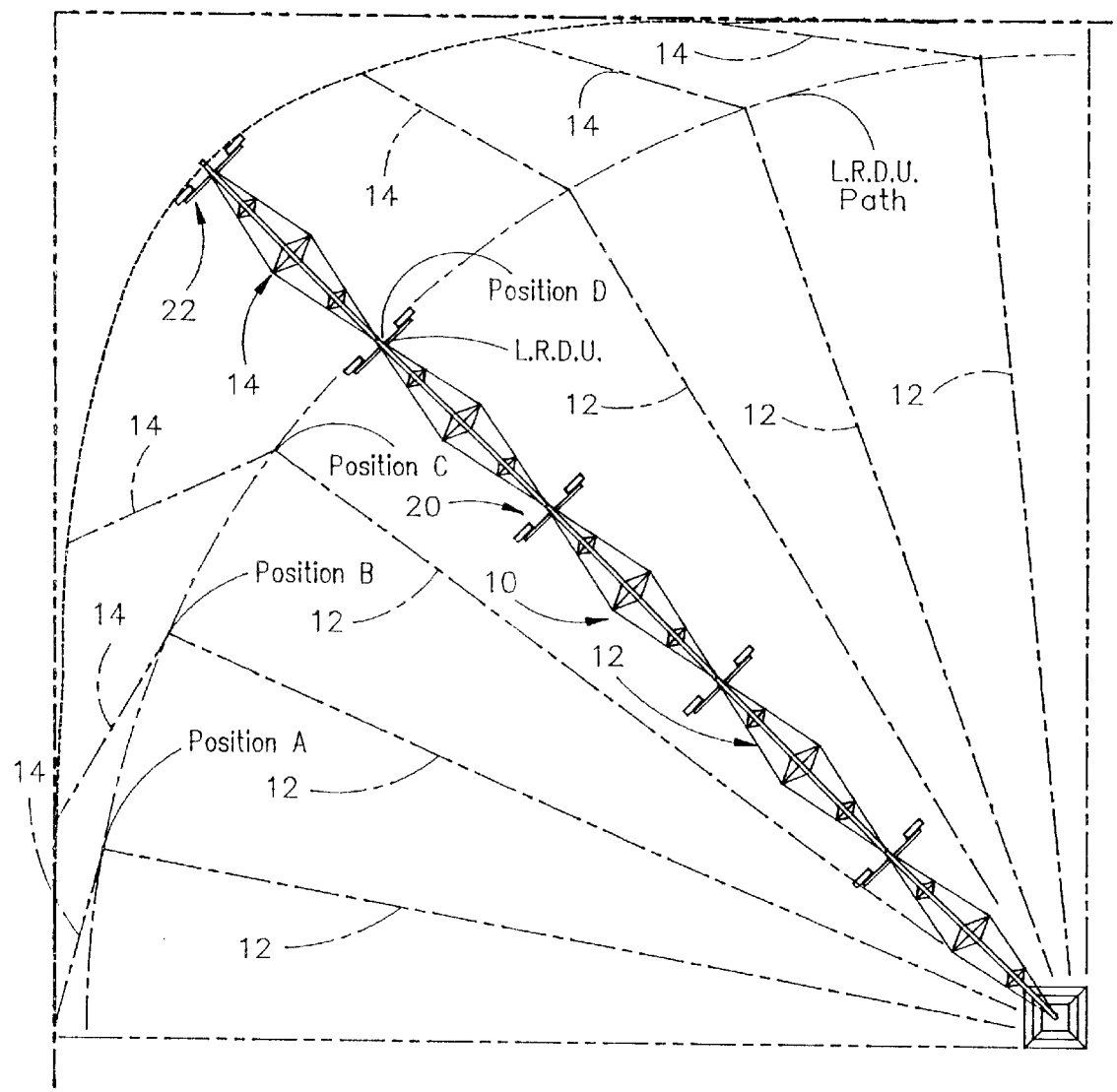
FIG. 2 is a plan view of a field having a center pivot irrigation system thereon which is operated by the method disclosed herein.
Figure 3:
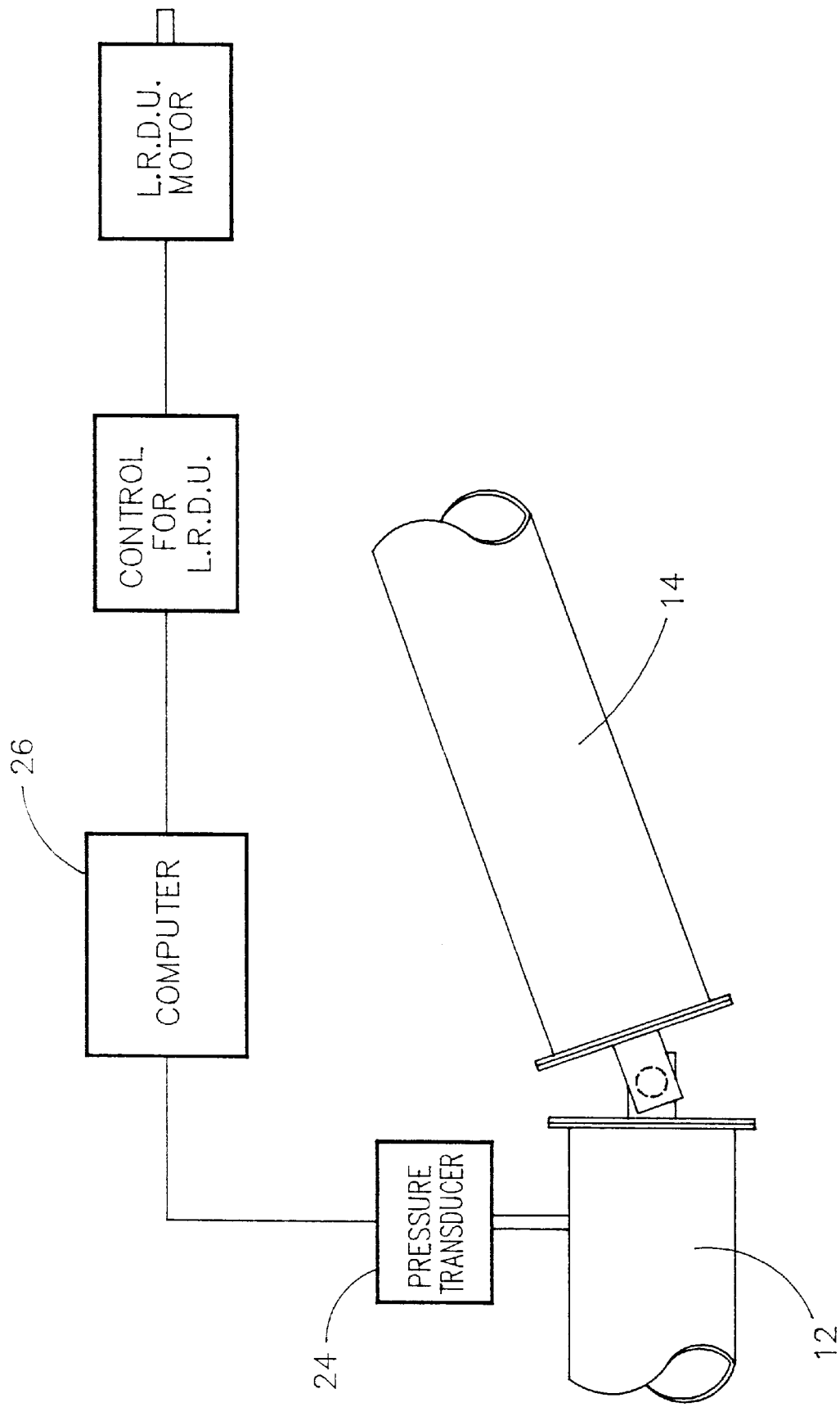
FIG. 3 is a schematic of the method of varying the speed of a center pivot irrigation system.

The numeral 10 refers generally to a self-propelled irrigation system or machine which is comprised of a center pivot irrigation system or machine 12 having a corner arm irrigation system or extension boom (corner span) 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. The outermost drive tower 20 is commonly referred to as the last regular drive unit (L.R.D.U.). Corner arm, corner span, corner boom or extension boom 14 is supported upon a steerable drive tower 22.

A pressure transducer 24 is provided at the downstream end of the center pivot system to monitor the change in the main line water pressure as the sprinklers are sequenced "on" or "off" on the corner span 14. A computer program in a computer 26 is used to monitor the pressure transducer output (end pressure). The pressure transducer output is recorded upon a predetermined amount of time increment compared to the pressure recorded when all the sprinklers on the corner span are turned off (retracted pressure recorded in computer software). If the end pressure has changed from the retracted pressure, the center pivot speed will be changed by the following equation using computer software: NEW SPEED=(END PRESSURE/RETRACTED END PRESSURE)$^{1/2}$×L.R.D.U. SPEED SETTING.

For example, assuming that the retracted end pressure is fifty-four psi and the maximum set speed of the L.R.D.U. is twelve fu/min, the speed of the L.R.D.U. would be changed as follows for the following examples:

| Position | End Pressure (psi) | Speed (ft/min) |
|----------|--------------------|----------------|
| A        | 54                 | 12.0           |
| B        | 48                 | 11.3           |
| C        | 38                 | 10.1           |
| D        | 27                 | 8.5            |

Thus it can be seen that an improved method for controlling the distribution of water from the center pivot portion of a center pivot irrigation system as the sprinklers on the corner span are sequenced. The pressure transducer at the downstream end of the center pivot system monitors the change in the main line water pressure as the sprinklers are sequenced "on" or "off" on the corner span. The computer program in the computer monitors the pressure transducer output (end pressure) with the pressure transducer output being recorded upon a predetermined amount of time increment. It should be noted that although the pressure transducer output is recorded upon a predetermined amount of time increment, the pressure transducer output could also be recorded upon a predetermined amount of movement of the center pivot machine. At any rate, the predetermined amount of time increment is compared to the pressure recorded when all the sequenced sprinklers on the corner span are turned off. If the end pressure has changed from the retracted pressure, the center pivot speed is changed according to the above-disclosed formula using computer software.

The method of this invention ensures that the water distribution under the center pivot portion of the system will be more uniform than that achieved with the prior art devices.

Thus it can be seen that the invention accomplishes at least all of its stated objectives.

I claim:

1. The method of controlling the speed of the last regular drive unit (L.R.D.U.) of a center pivot irrigation system having a corner irrigation system pivotally connected thereto which is movable out into the corners of a field to irrigate the same, said center pivot irrigation system including a main water line, having sprinklers provided thereon, supported by a plurality of spaced-apart drive units, said corner irrigation system including an extension water boom having sequenced sprinklers thereon, comprising the steps of:

placing a pressure transducer at the downstream side of said main water line for monitoring the changes in main line water pressure as the sprinklers on said extension water line are sequenced;

driving the L.R.D.U. at a predetermined speed (L.R.D.U. speed setting);

recording the output of said pressure transducer (end pressure) at predetermined intervals;

comparing the said recorded output (end pressure) at said predetermined intervals to the pressure recorded when all the sprinklers on said extension line are turned off (retracted end pressure);

and varying the speed of said L.R.D.U. approximately according to the formula: NEW SPEED=(END PRESSURE/RETRACTED END PRESSURE)$^{1/2}$× L.R.D.U. SPEED SETTING.

2. The method of claim 1 wherein said predetermined intervals are increments in time.

3. The method of claim 1 wherein said speed of said L.R.D.U. is continuously varied.

4. The method of controlling the speed of the last regular drive unit (L.R.D.U.) of a center pivot irrigation system having a corner irrigation system pivotally connected thereto which is movable out into the corners of a field to irrigate the same, said center pivot irrigation system including a main water line, having sprinklers provided thereon, supported by a plurality of spaced-apart drive units, said corner irrigation system including an extension water boom having sequenced sprinklers thereon, comprising the steps of:

placing a fluid transducer at the downstream side of said main water line for monitoring the changes in main line water pressure as the sprinklers on said extension water line are sequenced;

driving the L.R.D.U. at a predetermined speed (L.R.D.U. speed setting);

recording the output of said pressure transducer (end pressure) at predetermined intervals;

comparing the said recorded output (end pressure) at said predetermined intervals to the pressure recorded when all the sprinklers on said extension line are turned off (retracted end pressure);

and varying the speed of said L.R.D.U. according to a comparison of the end pressure and retracted end pressure.

* * * * *